United States Patent
Dannheisig et al.

(10) Patent No.: US 10,189,384 B2
(45) Date of Patent: Jan. 29, 2019

(54) STAMPING METHOD AND COMPONENTS PRODUCED THEREBY

(75) Inventors: Andreas Dannheisig, Sassenberg (DE); Bernd Groß, Langenfeld (DE); Jutta Klingspohn, Moosach (DE); Matthias Goebel, Köln (DE)

(73) Assignee: JOHNSON CONTROLS GMBH, Burscheid (DE)

( * ) Notice: Subject to any disclaimer, the term of this patent is extended or adjusted under 35 U.S.C. 154(b) by 0 days.

(21) Appl. No.: 14/122,237

(22) PCT Filed: Feb. 29, 2012

(86) PCT No.: PCT/EP2012/053442
§ 371 (c)(1),
(2), (4) Date: Jan. 15, 2014

(87) PCT Pub. No.: WO2012/159781
PCT Pub. Date: Nov. 29, 2012

(65) Prior Publication Data
US 2014/0212630 A1 Jul. 31, 2014

(30) Foreign Application Priority Data
May 26, 2011 (DE) .................. 10 2011 103 295

(51) Int. Cl.
*B21D 53/28* (2006.01)
*B60N 2/44* (2006.01)
(Continued)

(52) U.S. Cl.
CPC .............. *B60N 2/44* (2013.01); *B21D 53/88* (2013.01); *B26D 7/10* (2013.01); *B60N 2/90* (2018.02);
(Continued)

(58) Field of Classification Search
CPC . Y10T 83/04; Y10T 29/49472; B60N 2/2213; B21D 53/28
(Continued)

(56) References Cited

U.S. PATENT DOCUMENTS 2,600,453 A   6/1952  Weingart
2,861,166 A   11/1958 Cargill, Jr.
(Continued)

FOREIGN PATENT DOCUMENTS

CN   2421570 Y    2/2001
CN   101006189 A  7/2007
(Continued)

OTHER PUBLICATIONS

Office Action dated Sep. 28, 2014, received in corresponding Chinese application No. 201280025585.1 and English translation, 17 pages.
(Continued)

*Primary Examiner* — Ghassem Alie
*Assistant Examiner* — Nhat Chieu Do
(74) *Attorney, Agent, or Firm* — Foley & Lardner LLP

(57) ABSTRACT

A method for producing vehicle seat components involves working a semifinished blank in a cutting manner. The method can be carried out easily and at low cost and makes it possible to produce components that require little reworking and also provides a vehicle seat component that is both suitable for reducing crash energies by deformation and has an adequate wear resistance. The method includes local heating of the semifinished blank in the region of an intended cutting line of the vehicle seat components to be cut out and cutting out the vehicle seat components from the semifinished blank along the cutting line during or shortly after the heating.

7 Claims, 2 Drawing Sheets

(51) Int. Cl.
*B21D 53/88* (2006.01)
*B26D 7/10* (2006.01)
*B60N 2/90* (2018.01)

(52) U.S. Cl.
CPC ........... *B21D 53/28* (2013.01); *Y10T 83/0414* (2015.04); *Y10T 428/24777* (2015.01)

(58) Field of Classification Search
USPC ........................................................ 83/13, 16
See application file for complete search history.

(56) References Cited

U.S. PATENT DOCUMENTS

| | | | |
|---|---|---|---|
| 3,848,104 A | 11/1974 | Locke | |
| 4,223,547 A * | 9/1980 | Epner | B21D 28/10 72/254 |
| 4,537,102 A * | 8/1985 | Balzer | B23D 33/00 83/16 |
| 5,041,714 A * | 8/1991 | Funk | B23K 26/00 219/121.62 |
| 5,398,408 A * | 3/1995 | Bernet | B21D 53/28 29/893.33 |
| 5,690,386 A * | 11/1997 | Chabanne | B60N 2/688 297/367 R |
| 6,488,788 B2 | 12/2002 | Ito et al. | |
| 6,813,923 B2 | 11/2004 | Jones et al. | |
| 7,500,310 B2 * | 3/2009 | Oki | B60N 2/2356 148/573 |
| 7,736,102 B2 * | 6/2010 | El-Wardany | B23D 37/22 219/121.69 |
| 2002/0014291 A1 * | 2/2002 | Ito | C21D 9/32 148/586 |
| 2004/0108306 A1 * | 6/2004 | Wiezbowski | B23K 26/032 219/121.85 |
| 2006/0130940 A1 * | 6/2006 | Kollaritsch | B21D 22/022 148/518 |
| 2007/0246135 A1 | 10/2007 | Pollard | |
| 2009/0039060 A1 * | 2/2009 | Palmquist | B23K 26/0807 219/121.69 |
| 2009/0236892 A1 * | 9/2009 | Cillierre | B60N 2/2356 297/366 |
| 2010/0156143 A1 | 6/2010 | Gucker et al. | |
| 2012/0111161 A1 * | 5/2012 | Kuriki | B21D 28/26 83/16 |
| 2012/0169102 A1 * | 7/2012 | Hiemstra | B60N 2/2252 297/354.1 |

FOREIGN PATENT DOCUMENTS

| | | |
|---|---|---|
| DE | 43 21 477 A1 | 1/1994 |
| DE | 198 01 431 A1 | 7/1999 |
| DE | 10 2007 024 797 A1 | 11/2008 |
| JP | 58-181450 | 10/1983 |
| JP | 06-163554 | 6/1994 |
| JP | 2002-013613 | 1/2002 |
| JP | 2009-050859 | 3/2009 |

OTHER PUBLICATIONS

Office Action dated Jan. 6, 2015, in corresponding Japanese application No. 2014-511783, 4 pages.
Office Action dated Mar. 12, 2015, in corresponding Korean application No. 10-2013-7034367 and English translation, 8 pages.
International Search Report dated Jun. 5, 2012, as received in corresponding International Patent Application No. PCT/EP2012/053442.
International Preliminary Report on Patentability dated Nov. 26, 2013, as received in corresponding International Patent Application No. PCT/EP2012/053442.
Examination Report dated Jun. 26, 2018 received in corresponding Indian Application No. 3213/KOLNP/2013, 7 pages.

* cited by examiner

STAMPING METHOD AND COMPONENTS PRODUCED THEREBY

CROSS REFERENCE TO RELATED APPLICATIONS

The present application is a U.S. National Stage of International Application No. PCT/EP2012/053442 filed on Feb. 29, 2012, which claims the benefit of German Patent Application No. 10 2011 103 295.2 filed on May 26, 2011, the entire disclosures of all of which are incorporated herein by reference.

FIELD

The invention relates to a method for producing vehicle seat components, in particular components of a seat adjuster, by working a semifinished blank in a cutting manner. Furthermore, the invention relates to a vehicle seat component, in particular a component for a seat adjuster of a motor vehicle seat, with an edge area created by working in a cutting manner and a base section delimited by the edge area.

BACKGROUND

It is known from the state of the art to form vehicle seat components, in particular the components of a seat adjuster, by means of which a vehicle seat can be adjusted for the personal needs of the respective user, from a high-strength, semifinished blank through fine blanking and to harden these completely in a furnace in a subsequent, separate method step through case hardening. The vehicle seat component, in particular its functional sections, e.g. gear teeth, is thereby given the material property required for the function. In particular, for example, a sufficient hardness of the gear teeth as well as a strengthening in the area of the tooth base can thus be achieved.

Even though it is generally only required to subject the edge areas of the vehicle seat components designed by working in a cutting manner to heat treatment for a reliable function of the vehicle seat components, a complete heat treatment of the vehicle seat components produced in a cutting manner generally takes place in the method known from the state of the art. This results not only in very high processing costs. Moreover, the mechanical properties of the vehicle seat components are negatively impacted because a high ductility is desired in the sections of the vehicle seat component at a distance from the edge areas, so that the vehicle seat component is suitable in the event of a crash of reducing crash energy through deformation.

A further disadvantage of the known vehicle seat components normally produced through fine blanking of the components from a semifinished blank is that its clear cut surface is insufficient so that surface processing cannot be foregone in order to achieve the desired surface properties.

BRIEF SUMMARY

The object of the invention is to provide a method for producing vehicle seat components, in particular components of a seat adjuster, through working of a semifinished blank in a cutting manner, which can be performed easily and cast and enables the production of components requiring little post-processing. Furthermore, the object of the invention is to provide a vehicle seat component, which is both suitable for reducing crash energies through deformation and has sufficient wear resistance.

The invention solves the object through a method with the characteristics of claim 1 as well as a vehicle seat component with the characteristics of claim 8. Advantageous further embodiments of the invention are specified in the dependent claims.

Essential for the method according to the invention for producing vehicle seat components, in particular components of a seat adjuster, through the working of a semifinished blank in a cutting manner, are the method steps: local heating of the semifinished blank in the area of an intended cutting line 52 of the vehicle seat components to be cut out and the cutting out of the vehicle seat components from the semifinished blank along the cutting line 52 during or shortly after the heating.

It is provided according to the invention that the semifinished blank, from which the vehicle seat component is made within the framework of a working in a cutting manner, e.g. fine blanking, is heated before the cut, wherein the heating is limited to areas of the cutting line 52 during the cut of the vehicle seat component from the semifinished blank. The heating can thereby be expanded to all areas, which are subject to the working in a cutting manner. However, it is also possible to only heat partial areas of the cutting line 52 so that material properties resulting from the heating of the cut edges resulting from the cutting line 52 of the vehicle seat components can be set in sections.

The working of the semifinished blank in a cutting manner for producing the vehicle seat components takes place according to the invention during or shortly after the heating process of the semifinished blank to the desired process temperature. Besides the improvement of the material properties, in particular the hardness and/or strength values of the later cut edges of the vehicle seat components, the processing forces, e.g. cutting pressures, required for the working in a cutting manner are considerably reduced through the heating. Moreover, the quality of the cut in contrast to the cold-cut, semifinished products known from the state of the art is increased, which leads to an increased clear cut surface, which can be up to 100%.

The heating of the semifinished blank according to the invention thus leads to an overall improvement in the product properties of the vehicle seat components, namely that the selected edge areas have the required rigidity and, moreover, the other base section delimited by the edge area has a sufficient ductility in order to reduce crash energies through deformation in the event of a crash. Moreover, the heating facilitates the production process of the vehicle seat components, wherein less energy is needed to perform the process. Through suitable heating of the semifinished blank, later heat treatments and/or surface treatments of the vehicle seat components can also be foregone, which contributes to a supplemental reduction in production costs.

For further improvement of the material properties of the vehicle seat components, it is provided according to a further embodiment of the invention that the vehicle seat components are partially, in particular in the area of their cut edges, or completely heated subsequent to their being cut. Through this embodiment of the invention, which generally provides for a freely selectable heating of the cut out vehicle seat component, individual areas can be set in their material property in the required manner. The entire vehicle seat component can also be adjusted in its property for the requirements along its cut edge through the controlled heating, wherein different areas of the cut edges can have different material properties through different heatings.

Overall, the subsequent heating of the cut edges permits in a particularly advantageous manner the adjustment of the vehicle seat component.

The local heating of the semifinished blank before the working in a cutting manner but also the advantageously provided partial or complete heating of the cut out vehicle seat component can generally take place in any manner. Thus, it is for example possible to already heat the vehicle seat components in a device located upstream from a cutting device, for example through a suitable furnace or through heat-generating forging. The use of a heating system integrated into the cutting device or a downstream heating system is also conceivable in that the advantageously provided heat treatment can be performed subsequent to the cut.

However, it is provided according to a particularly advantageous embodiment of the invention that the local heating of the semifinished blank and/or the partial or complete heating of the cut vehicle seat component is achieved through the effect of heat radiation, in particular through directed radiation. Through the corresponding heating of the semifinished blank and/or the cut vehicle seat component, the area to be heated can be precisely defined so that mainly only those areas are subject to a heat treatment in which a corresponding hardness and/or rigidity increase is later desired.

In particular, precisely defined heat input can be achieved in a particular manner through the use of directed radiation so that the areas where the material properties need to remain unchanged experience no heating. The use of a high-energy radiation makes it possible to heat in a punctiform or whole-surface manner the area of the cut edges to be hardened to the temperature necessary for the hardening within a short period of time, wherein, due to the very fast heating through radiation, the cooling process required for the hardening can take place right away afterwards via the vehicle seat component itself, which is not heated due to the inertness of the heat conduction during the brief period.

According to a particularly advantageous further embodiment of the invention as shown, for example, in FIG. 3, it is thereby provided that the partial or complete heating of the cut vehicle seat component 1 by a heating device 40 takes place through a deflection of the directed radiation taking place via a beam filter 42, a mirror 44, and/or beam diffraction 46. The use of a beam filter 42, a mirror 44 and/or a beam diffraction 46 makes it possible to use a radiation source potentially already used for heating the semifinished blank 10 in an unchanged form also for the partial or complete heating of the cut vehicle seat components 1, wherein the control and alignment of the radiation source thereby takes place via the beam filter 42, the mirror 44, and/or the beam diffraction 46, in which e.g. an electron beam is controlled by means of a magnetic field. Extensive control movements of the radiation source can be forgone according to this further embodiment of the invention.

As already initially explained and as shown in FIG. 3, the heating of the semifinished blank 10 and/or the cut vehicle seat component 1 can take place at any location. It is thus possible for example to heat the semifinished blank 10 in a first separate heating device 20 before placement in a corresponding cutting device 30. Also in the case of a subsequent heat treatment of the cut out vehicle seat component 1, this can be performed in a second separate heating device 40. However, it is provided according to an advantageous further embodiment of the invention that the heating of the semifinished blank 10 and/or the cut vehicle seat component 1 takes place in the cutting device 30. According to this further embodiment of the invention, the cutting device 30, in which the vehicle seat component 1 is separated from the semifinished blank 10, is designed such that it enables a heating of the semifinished blank 10 and/or the cut vehicle seat component 1 within the cutting device 30. The heating can thereby take place directly via the cutting device 30, which is designed accordingly, or the cutting device 30 can be designed such that it enables access to the semifinished blank 10 and/or to the cut vehicle seat component 1 for suitable heating devices 20 and/or 40. In the case of the advantageously provided use of directed radiation, the cutting device 30 according to this further embodiment of the invention is designed for example such that the radiation can be directed directly or via advantageously provided deflection devices at mainly all areas of the semifinished blank 10 and/or the cut vehicle seat component 1.

Generally, a desired material property of the vehicle seat components 1 to be produced can already be achieved through a suitable heating. However, it is provided according to a particularly advantageous further embodiment of the invention that the cut out vehicle seat component 1 is cooled subsequent to being cut from the semifinished blank 10 with a cooling device 50, as shown, for example, in FIG. 4. The performance of a cooling, which can generally take place in any manner, permits the adjustment of the hardness and/or strength values in a particularly reliable manner for the desired requirements. It is thereby provided in a particularly advantageous manner that the cooling, for which separate cooling devices or cooling means can also be used, takes place through convection and/or heat conduction into the cutting device 30, in particular into a clamping device of the cutting device 30.

According to this further embodiment of the invention, the cutting device 30 can be designed such that it is designed to cool the cut out vehicle seat component 1 in a controlled manner, for which it is provided e.g. with suitable cooling channels, which can also be designed for the connection of cooling aggregates. However, it is provided in a particularly advantageous manner that the cutting device 30, in particular a clamping device of the cutting device 30, is designed such that the cooling is achieved through convection and/or heat conduction into the cutting device 30 so that separate cooling devices can be foregone, whereby the production costs can be reduced in a supplemental manner.

It is essential for a vehicle seat component according to the invention, in particular a component for a seat adjuster of a motor vehicle seat, with a working of an edge area 54 in a cutting manner and a base section delimited by the edge area 54 that the edge area 54 has at least partially a greater hardness and/or rigidity than the base section. The edge area 54 of the vehicle seat component, in particular the component for a seat adjuster, is defined by the area, which lies in the area of the working in a cutting manner during the production of the vehicle seat component from a semifinished blank. These are in particular the peripheral surfaces or the vehicle seat components, such as hereby produced gear teeth, but also openings in the vehicle seat components, which serve e.g. to arrange them on a suitable shaft or axis.

According to the invention, these areas have at least partially a greater hardness and/or rigidity than the base section so that the vehicle seat component according to the invention in the contact area has the required hardness and/or rigidity, on the other hand has in the area of the base section a ductility, which enables the reduction of impact energy through deformation work in the event of a crash. Moreover, such vehicle seat components have the advantage that an inexpensive and relatively thin work piece can be used after the required hardness and rigidity properties are present in a required area. In a particularly advantageous manner, the vehicle seat components are thereby produced according to a method according to one or more of claims 1-7.

According to a particularly advantageous embodiment of the invention, the edge areas 54 of the vehicle seat components are thereby surface-hardened so that the base section has a high share of the vehicle seat component and overall a high degree of energy absorbability through deformation is provided by the vehicle seat component in the case of sufficient hardness and/or rigidity of the edge areas 54. In a particularly advantageous manner, the edge area 54 is thereby hardened through heat radiation, in particular directed radiation, wherein edge areas 54 hardened in this manner enable the formation of a particularly large base section.

BRIEF DESCRIPTION OF THE DRAWINGS

An exemplary embodiment of the invention is explained in greater detail below in reference to the drawings. The drawings show in.

DETAILED DESCRIPTION

Figure 1:
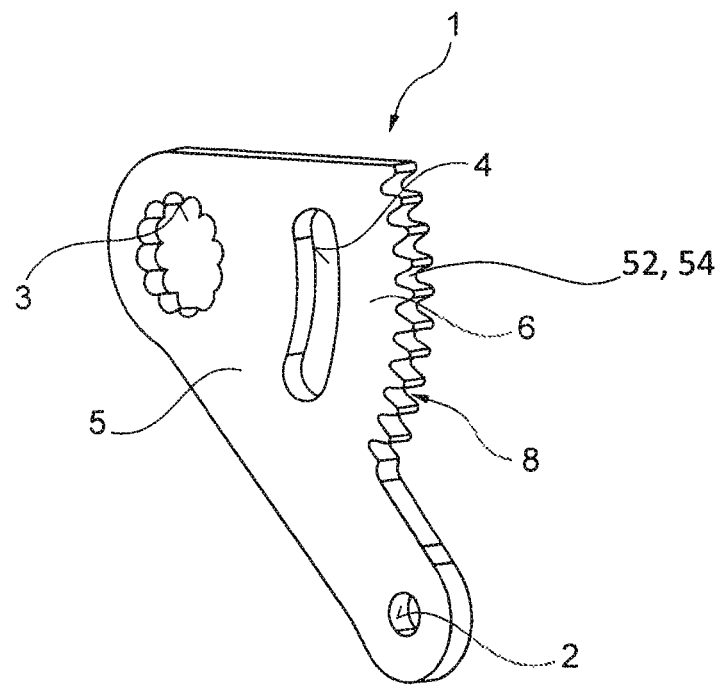
FIG. 1 a component of a seat adjuster in a perspective view.

Component 1 in FIG. 1 of a seat adjuster (not shown here) is a hinged bracket of a quadruple joint for the height-adjustable mounting of a vehicle seat (also not shown here) on a seat rail (not shown). The component 1 has two recesses 2, 3, which are cut out in the area of the rotational axes of the hinged bracket. A further, arc-cut recess 4 serves for the feed through of command and control equipment.

Figure 2:
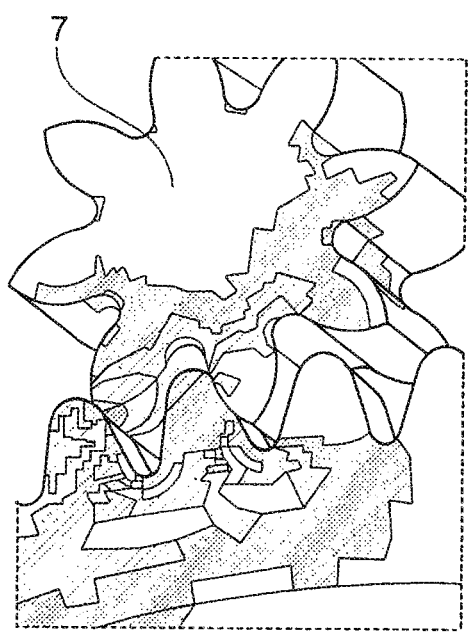
FIG. 2 a stress distribution in gear teeth of the component for the seat adjuster and a pinion in the case of an accident-caused load.
Figure 3:
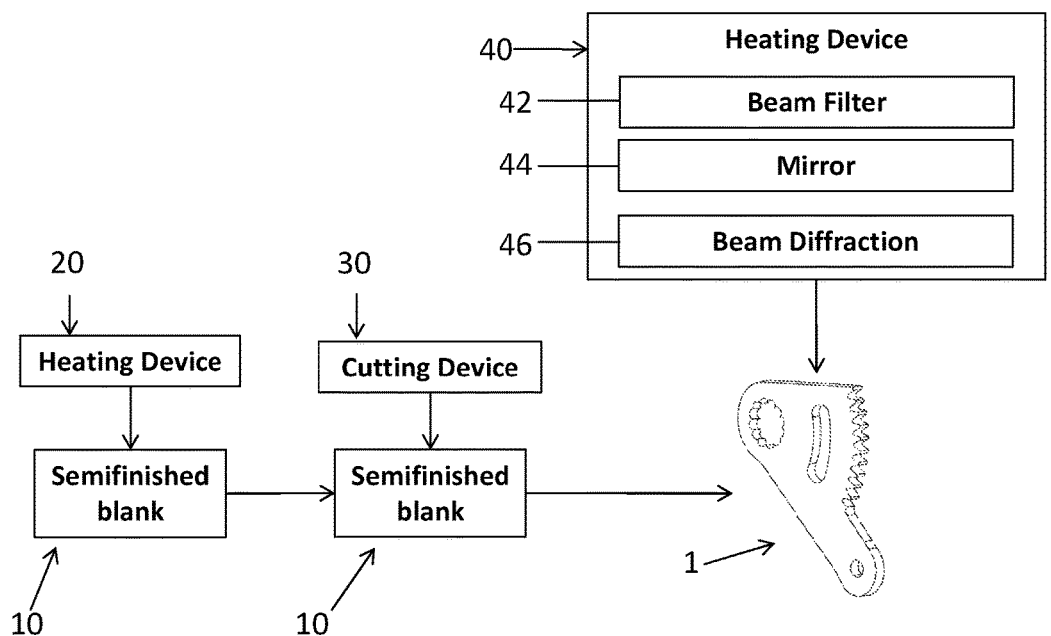
FIG. 3 is a schematic view of producing a vehicle seat component from a semifinished blank according to one embodiment.
Figure 4:
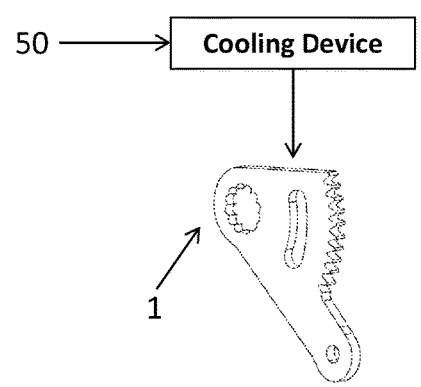
FIG. 4 is a schematic view of a cooling device according to one embodiment.

The base section 5 of the component 1 has a particularly high ductility so that the component 1 has a beneficial energy absorption behavior upon impact of accident-caused load peaks. On a part of its likewise cut outer circumference, the component 1 is equipped with gear teeth 6, which engage with a pinion 7 of a height adjuster shown in FIG. 2. Deviating from the requirements for the base section 5 of the component 1, it is desired that the gear teeth 6 have a sufficient hardness and the tooth base 8 has a rigidity increase with respect to the base section 5.

These properties are thereby achieved in that the semifinished blank, from which the component 1 is formed through working in a cutting manner, is heated only locally along the intended cutting line, in particular in the area of the gear teeth 6 before the fine blanking and is cut at the same time or preferably with a slight time delay. The base section 5 is thus mainly untouched by this heat treatment and retains its original mechanical properties.

The invention claimed is:

1. A method for producing vehicle seat components through the working of a semifinished blank in a cutting manner, the method comprising:
    locally heating the semifinished blank in the area of an intended cutting line of the vehicle seat components to be cut out;
    cutting out the vehicle seat components from the semifinished blank with a cutting device along the cutting line during or after the heating of the semifinished blank to create an entire edge area of the vehicle seat components, wherein the edge area comprises an entire peripheral surface of the vehicle seat components and openings in the vehicle seat components, wherein the semifinished blank is locally heated with the cutting device while the semifinished blank remains in the cutting device, and
    wherein the vehicle seat components each comprise a base section delimited by the edge area;
    partially heating the vehicle seat components with the cutting device while the vehicle seat components remain in the cutting device after having been cut from the semifinished blank such that all of and only the edge areas of the vehicle seat components are directly heated after the vehicle seat components have been cut; and
    cooling the vehicle seat components through heat conduction into the cutting device after the cutting out of the vehicle seat components,
    wherein the local heating of the semifinished blank and the partial heating of the vehicle seat components is achieved through the effect of heat radiation,
    wherein all of the edge area of at least one of the vehicle seat components is hardened through the effect of heat radiation during the partial heating of the vehicle seat components.

2. The method according to claim 1, wherein the heating of the vehicle seat components takes place through a deflection of directed radiation taking place by a beam filter, a mirror and/or beam diffraction.

3. The method according to claim 1, wherein the vehicle seat components are configured to be components for a seat adjuster of a motor vehicle seat.

4. The method according to claim 1, wherein the cutting device comprising a clamping device that cools the vehicle seat components through the heat conduction into the cutting device.

5. The method according to claim 1, wherein different areas of the edge areas of the vehicle seat components have different material properties as a result of different beatings.

6. The method according to claim 1, wherein the vehicle seat components are cut out from the semifinished blank along the cutting line during the local heating of the semifinished blank in the area of the cutting line.

7. The method according to claim 1, wherein the cutting device is configured to cool the vehicle seat components in a controlled manner.

* * * * *